Aug. 5, 1958  E. S. GANDRUD  2,846,125
ROTOR BAR STRUCTURE FOR DISPENSERS OF GRANULAR MATERIAL
Filed April 23, 1956  2 Sheets-Sheet 1
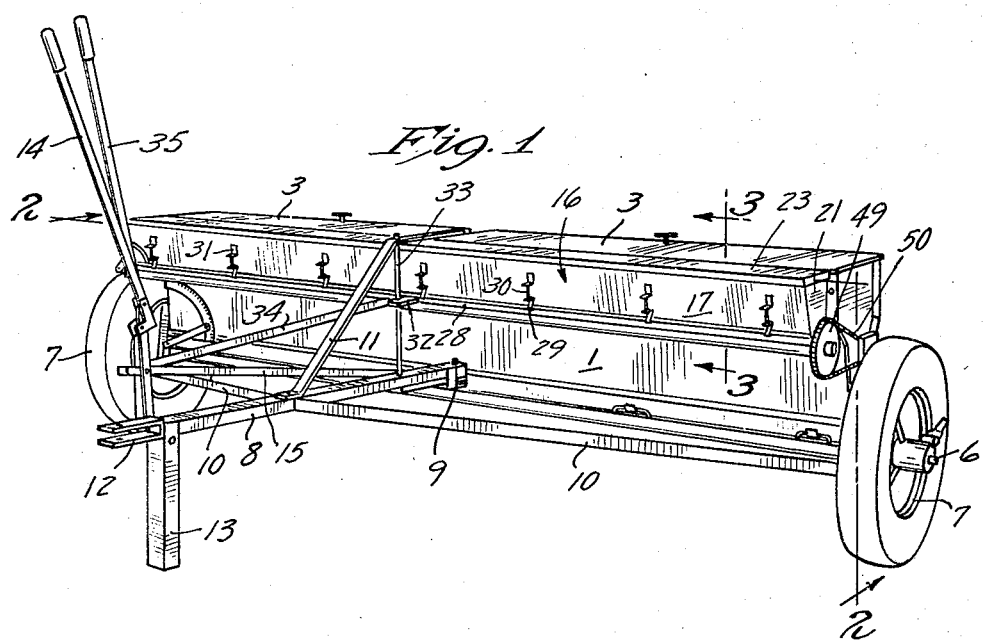
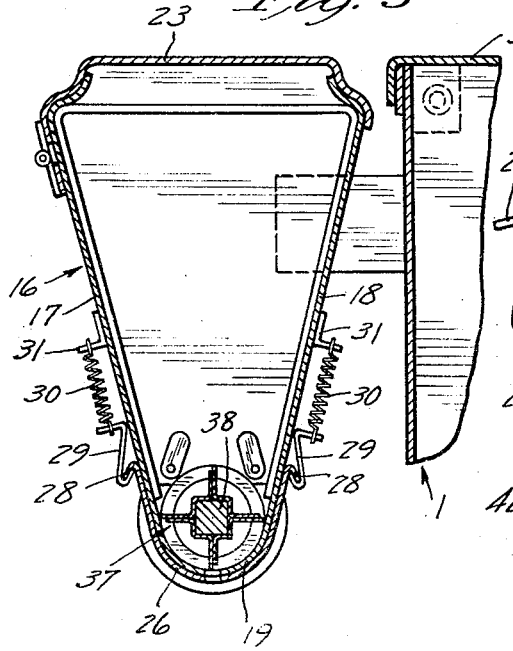
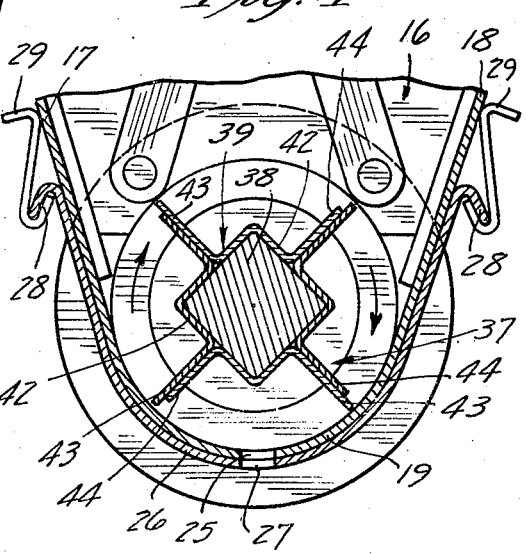
INVENTOR.
Ebenhard S. Gandrud
BY
Merchant & Merchant
ATTORNEYS

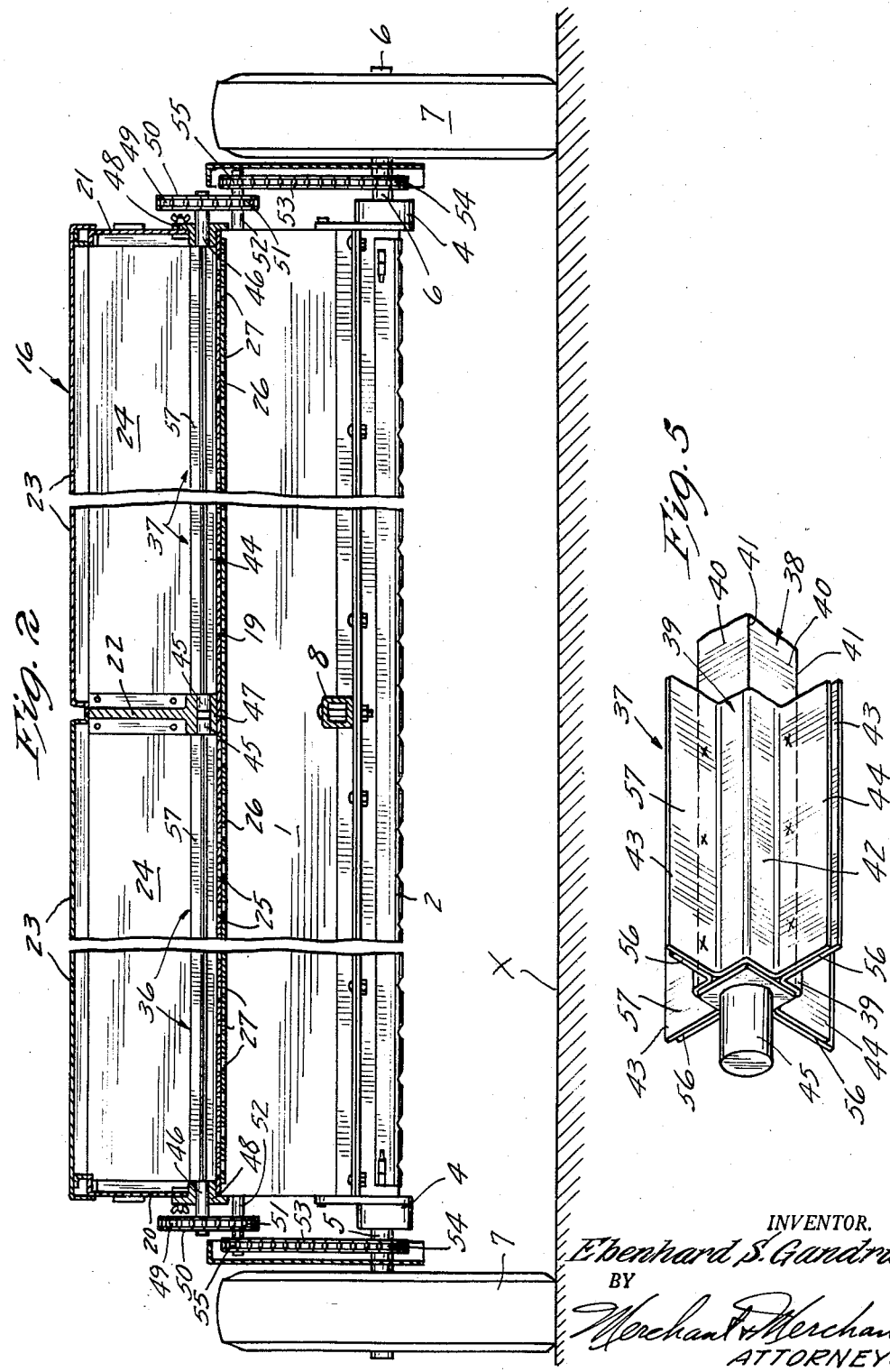

United States Patent Office 2,846,125
Patented Aug. 5, 1958

2,846,125

ROTOR BAR STRUCTURE FOR DISPENSERS OF GRANULAR MATERIAL

Eberhard S. Gandrud, Owatonna, Minn.

Application April 23, 1956, Serial No. 580,118

4 Claims. (Cl. 222—410)

My invention relates generally to devices for distributing granular or powdered material such as seeds, fertilizer or the like, over a field, and more particularly to improvements in agitators or feeding rotors usually found in such devices.

More specifically, my invention is in the nature of an improved agitator or feeding rotor for spreaders of the type disclosed in my prior United States Letters Patent No. 2,350,107 issued May 30, 1944.

For accurate uniform feeding or distribution of seed or granular or powdered fertilizer, it is important that a definite predetermined clearance be maintained between the inner surface of the perforate bottom of the feeding hopper and the feeding rotor, to prevent material from adhering to said inner bottom surface and building up thereon to a point wherein the bottom of the hopper becomes distorted, or the feeding rotor becomes bent between its ends. The primary object of my invention is, therefore, the provision of a feeding rotor which effectively feeds material to the discharge apertures in the bottom of the distributing hopper without crushing the material against the inner wall surface of the hopper bottom, and without injury to seed when used to distribute the same.

Another object of my invention is the provision of an elongated feeding rotor which is extremely rigid along its entire length.

Another object of my invention is the provision of a feeding rotor as set forth having longitudinally extended radial feeding vanes which are relatively thick toward their radially inner portions, and which have relatively thin radially outer edge portions which prevent material from being squeezed or crushed therebetween and the bottom of the hopper.

Still another object of my invention is the provision of a feeding rotor which is exceedingly simple and inexpensive to produce, which is highly efficient in operation, and which is rugged in construction and durable in use.

The above and still further highly important objects and advantages of my invention will become apparent from the following detailed specification, appended claims, and attached drawings.

Referring to the drawings, which illustrate the invention, and in which like characters indicate like parts throughout the several views:

Fig. 1 is a view in perspective of a spreading device incorporating my invention;

Fig. 2 is an enlarged view partly in section and partly in front elevation taken substantially on the line 2—2 of Fig. 1, some parts being broken away and some parts removed;

Fig. 3 is a still further enlarged fragmentary vertical section taken substantially on the line 3—3 of Fig. 1;

Fig. 4 is a still further enlarged detail corresponding to the lower end portion of Fig. 3; and Fig. 5 is a fragmentary view in perspective of the feeding rotor of my invention.

Referring with greater detail to the drawings, the numeral 1 indicates an elongated hopper having mounted at its bottom portion a perforate valve-acting gate plate 2 and closed at its upper end by cover elements 3. A pair of bearing elements 4 are rigidly secured to opposite ends of the hopper 1 adjacent the bottom thereof and journal shafts 5 and 6 on which are mounted pneumatic tire equipped wheels 7. A forwardly projecting tongue 8 is rigidly secured at its rear end to the hopper 1 as indicated at 9 and is connected to opposite ends of the hopper 1 by brace members 10 and to the top portion of the hopper 1 by a rearwardly inclined brace member 11. At its front end, the tongue 8 is bifurcated to provide a coupling element 12 for attachment to the drawbar of a tractor or the like whereby the machine may be drawn over a field. A supporting leg 13 is pivotally connected to the tongue 8 rearwardly of the coupling 12 and is shown in Fig. 1 as being moved to an operative ground engaging position. The leg 13 is pivotally movable to an inoperative position in closely spaced parallel relation to the tongue 8 when the machine is coupled to a tractor or the like. Means for moving the valve acting gate plate 2 to the right or left with respect to Figs. 1 and 2 includes an operating handle 14 pivotally secured at its lower end to the tongue 8, and coupled to a rigid link 15 that may be assumed to be connected to the gate plate 2 by suitable linkage not shown. It may be further assumed that a suitable feeding rotor or agitator is coupled to the shafts 5 and 6 within the hopper 1 for feeding granular material from the hopper 1 through the discharge apertures in the gate plate 2. The structure of the above type is fully disclosed in my prior patent above identified, and in itself, does not comprise the instant invention. Hence, for the sake of brevity, detailed showing and description thereof is omitted.

Mounted forwardly of the upper end of the hopper 1 is an elongated secondary hopper 16 having front and rear walls 17 and 18 respectively, an arcuate bottom wall 19, ends walls 20 and 21, a central partition 22 and a pair of removable covers 23. The central partition 22 divides the hopper into a pair of spaced compartments 24, the arcuate bottom wall 19 of the hopper 16 being provided with a plurality of longitudinally spaced discharge openings 25 for the delivery of granular material from the compartments 24 to the ground, indicated at X, see Fig. 2. A cross sectionally arcuate valve acting gate plate 26 is mounted at the bottom of the hopper 16 and is provided with a plurality of longitudinally spaced openings 27 that are movable into and out of registration with the discharge ports 25 of the hopper bottom 19. For the purpose of the present example, the gate plate 26 is shown as being provided at its opposite side edges with downturned flanges 28 that are engaged by hook elements 29 carried by coil tension springs 30. As shown in Figs. 1 and 3, the upper ends of the springs 30 are secured to anchoring brackets 31 welded or otherwise rigidly secured to the front and rear walls 17 and 18 respectively of the hopper 16. Like the gate plate 2, the valve acting gate plate 26 is movable longitudinally of its respective hopper 16 by means of suitable linkage including a bell crank lever 32 pivotally secured to a shaft 33 mounted at its opposite ends on the tongue 8 and the upper end of the brace member 11. One end of the bell crank 32 is pivotally connected to the gate plate 26, the other end thereof being pivotally connected to a rigid link 34 which in turn is pivotally secured to the intermediate portion of a control handle or lever 35 similar to the control handle 14, see Fig. 1.

Mounted in the botom portions of the compartments 24, in concentric relation to the arcuate bottom wall 19 thereof are a pair of elongated agitators or feeding rotors 36 and 37. Except for the fact that one is right-hand and the other is left-hand, the feeding rotors 36 and 37 are identical, and the latter thereof only will be described in detail. The feeding rotor 37 comprises an axially extended rotor shaft 38 and a tubular body comprising a plurality of identical cooperating body sections 39. In the preferred embodiment of my invention, the central shaft 38 is shown as being cross sectionally square and having longitudinally extended plane surfaces 40 which cooperate to define longitudinally extended longitudinal corners or edges 41. The body sections each comprise a longitudinally extended angular central portion 42 which overlies one of the longitudinal edges 41 of the shaft 38 and portions of adjacent plane surfaces 40 thereof. The opposite longitudinal edge portions of the body sections 39 are bent outwardly to provide longitudinally extended flanges 43 and 44 which project generally radially outwardly from the central shaft 38 and normal to the underlying plane surfaces 40 thereof. As shown in Figs. 3-5, each flange 43 has a greater radial length than that of the flanges 44, and each flange 43 is contiguous with the flange 44 of an adjacent body section 39. Each pair of contiguous flanges 43 and 44 are spot-welded or otherwise rigidly secured together in face to face engagement at longitudinally spaced points, preferably for the entire length of the rotor. In the producing of the rotors 36 and 37, it is preferable that the relative dimensions of the central shaft 38 and the central portions 42 of the several cooperating body sections 39 are such that, when the body sections 39 are applied to the shaft 38, the contiguous flanges 43 and 44 must be pulled into face to face engagement by suitable clamping means not shown before the cooperating flanges are welded or otherwise secured together.

With this arrangement, the central shaft 38 is so tightly engaged by the tubular body, that no other means need be employed to secure the same together against relative axial movement.

The central shafts 38 of the feeding rotors 36 and 37 are each formed to provide trunnion elements 45 and 46, the former of which are journaled in a bearing 47 formed in the lower end of the central partition 22, and the latter of which are journaled in end bearings 48 removably secured to the end walls 20 and 21 of the hopper 16, see Fig. 2. The relatively long shaft-like trunnion elements 46 extend outwardly through their respective bearings 48 and are provided, outwardly of the hopper 16, with sprocket wheels 49. Endless link chains 50 run over each of the sprockets 49 and cooperating sprockets 51 that are mounted on jack shafts or the like 52 suitably journaled in the opposite ends of the hopper 1. The jack shafts 52 are driven from their respective wheel mounting shafts 5 and 6 by link chains 53 running over sprocket wheels or the like 54 rigidly mounted one each on a different one of the wheel mounting shafts 5 and 6, and over other sprocket wheels 55 one each mounted on a different one of the jack shafts 52. From the above it should be obvious that the feeding rotor 36 is driven from the wheel mounting shaft 5 independently of the feeding rotor 37, which is driven from the wheel mounting shaft 6.

Each pair of welded together flanges 43 and 44 cooperate to provide radial feeding vanes 56, the radially longer flanges 43 defining the leading faces 57 thereof. Inasmuch as each flange 43 is of greater radial length than its cooperating flange 44, the feeding vanes 56 are of greater thickness radially inwardly of their outer edge portions than at the outer edges thereof. This greater or double thickness of the vanes 56 adds sufficient strength to the vanes to make the same extremely rigid, whereas the relative thinness of the outer edges permits the rotors 36 and 37 to effectively feed material to the discharge openings 25 in the hopper bottom 19 without permitting the material to be caught between the outer edges and the underlying inner surface of the hopper bottom 19. It will be noted, with reference particularly to Fig. 4, that the radially outer longitudinal edges of the flanges 43 work very close to the inner surface of the arcuate hopper bottom 19. In practice, only a clearance fit is maintained between said radially outer longitudinal edges of the flanges 43 and the underlying inner surface of the arcuate bottom portion 19 of the hopper 16. Inasmuch as the faces 57 of the several vanes 56 on both feeding rotors 36 and 37 are the leading faces thereof, the relatively longer trunnion elements 46 extend in opposite directions from their respective feeding rotors whereby to make one thereof left-hand and the other thereof right-hand, and so that each may be independently driven from their respective wheel mounting shafts 5 and 6.

In practice I have found that, in a feeding rotor as above described, extreme rigidity is achieved at relatively low cost. Neither the shaft 38 nor the tubular body, in themselves, have sufficient rigidity to prevent longitudinal bending under extreme adverse operating conditions. However, when the same are assembled as above described, each thereof reinforces the other thereof to the extent that the feeding rotors remain straight and true under even the most adverse operating conditions, and feeding of material from the hopper 16 is maintained at a highly accurate uniform rate. While I have shown the shaft 38 as being cross sectionally square, it will be appreciated that the same may be of any desired cross sectional shape. The tubular body sections 42, together with their respective integrally formed flanges 43 and 44 may, if desired, be made from any suitable rigid sheet material. However, I prefer to use metal such as steel because of its relatively low cost and suitability for the purposes intended.

Although the hopper 1 is not shown as containing a feeding rotor, it may be assumed that a pair of feeding rotors similar to the rotors 36 and 37 are also contained in the hopper 1 and suitably coupled to the wheel mounting shafts 5 and 6 in a manner similar to that shown and described in my prior United States patent above identified.

While I have shown and described a commercial embodiment of my novel feeding rotor structure, it will be understood that the same is capable of modification, and that modification may be made without departure from the spirit and scope of the invention as defined in the claims.

What I claim is:

1. In a device of the kind described, a hopper having side walls and a perforate bottom wall, and a feeding rotor mounted in said hopper in parallel relation to said bottom wall, said feeding rotor comprising axially extended rotary shafting and a tubular body encompassing said shafting and secured thereto for common rotation therewith, said body being made from rigid sheet material and including a plurality of longitudinally extended cooperating body sections each having a longitudinally extending central portion conforming to the cross sectional shape of the underlying portion of the shafting engaged thereby, and opposite longitudinal edge portions defining flat circumferentially spaced flanges which project radially outwardly from said shafting, the flanges of one of said body sections being contiguous with flanges of adjacent body sections and rigidly secured thereto in face to face relationship to define therewith flat radial feeding vanes, said shafting defining axial trunnion elements extending outwardly of the opposite ends of said tubular body.

2. The structure defined in claim 1 in which one of the flanges of each of said body sections is of greater radial length than the other thereof, the radially longer flange of each body section being contiguous with the radially shorter flange of an adjacent section, whereby the radially outer edge portion of each of said feeding vanes is of a thickness equal to one half that of the radially inner portions of said vanes.

3. In a device of the kind described, a hopper having side walls and a perforate bottom wall, and a feeding rotor mounted in said hopper in parallel relation to said bottom wall, said feeding rotor comprising a cross sectionally polygonal rotary shaft defining angularly disposed plane faces, and a tubular body encompassing said shaft, said body being made from rigid sheet material and including a plurality of longitudinally extending body sections each having a longitudinally extending angular central portion overlying and engaging adjacent angularly disposed plane face portions of said shaft, the opposite longitudinal edge portions of said body sections defining flat angularly disposed longitudinally extending flanges which project generally radially outwardly from said rotor shaft, the flanges of one of said body sections being contiguous with flanges of adjacent body sections and rigidly secured thereto in face to face relationship to define therewith flat radial feeding vanes, said shaft defining axial trunnion elements extending outwardly of the opposite ends of said tubular body.

4. In a device of the kind described, a hopper having side walls and a perforate bottom wall, and a feeding rotor mounted in said hopper in parallel relation to said bottom wall, said feeding rotor comprising a cross sectionally square shaft and an elongated tubular body encompassing said shaft, said body being made from rigid sheet material and including four like body sections each having a longitudinally extended angular central portion overlying a different longitudinal edge and adjacent plane surface portions of said shaft, the opposite longitudinal edge portions of said body sections defining flat angularly disposed longitudinally extended flanges which project generally radially outwardly from an adjacent one of the plane surfaces of said shaft and normal thereto, one of the flanges of each of said sections having a greater radial length than the other thereof, each of the radially longer flanges being contiguous to a different one of the shorter flanges and welded thereto and cooperating therewith to provide flat radial feeding vanes, the radially longer flanges defining the leading faces of said vanes, the opposite ends of said shaft defining axial trunnion elements extending outwardly of the opposite ends of said tubular body.

References Cited in the file of this patent

UNITED STATES PATENTS

| | | |
|---|---|---|
| 1,309,059 | Bacon | July 8, 1919 |
| 2,475,381 | Erickson | July 5, 1949 |
| 2,508,195 | Seaman et al. | May 16, 1950 |
| 2,530,181 | Schilling | Nov. 14, 1950 |
| 2,723,053 | Gandrud | Nov. 8, 1955 |
| 2,736,467 | Durand | Feb. 28, 1956 |